United States Patent
Chen et al.

(10) Patent No.: US 11,100,178 B2
(45) Date of Patent: Aug. 24, 2021

(54) METHOD AND DEVICE FOR PUSHING INFORMATION

(71) Applicant: BEIJING SANKUAI ONLINE TECHNOLOGY CO., LTD, Beijing (CN)

(72) Inventors: Ye Chen, Beijing (CN); Tao Zhang, Beijing (CN); Xing Wang, Beijing (CN); Zhihao Zheng, Beijing (CN); Jing Li, Beijing (CN); Shuhong Ye, Beijing (CN); Dan Shen, Beijing (CN); Guanhai Wang, Beijing (CN); Gong Zhang, Beijing (CN); Xiaolei Zhao, Beijing (CN); Hong Guan, Beijing (CN)

(73) Assignee: BEIJING SANKUAI ONLINE TECHNOLOGY CO., LTD, Beijing (CN)

(*) Notice: Subject to any disclaimer, the term of this patent is extended or adjusted under 35 U.S.C. 154(b) by 266 days.

(21) Appl. No.: 16/070,058

(22) PCT Filed: Dec. 30, 2016

(86) PCT No.: PCT/CN2016/113588
§ 371 (c)(1),
(2) Date: Jul. 13, 2018

(87) PCT Pub. No.: WO2017/121251
PCT Pub. Date: Jul. 20, 2017

(65) Prior Publication Data
US 2019/0012392 A1 Jan. 10, 2019

(30) Foreign Application Priority Data
Jan. 13, 2016 (CN) .......................... 201610022317.4

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 16/00* (2019.01); *G06F 16/313* (2019.01); *G06F 16/901* (2019.01); *G06F 16/90335* (2019.01)

(58) Field of Classification Search
CPC .... G06F 16/9535; G06F 16/00; G06F 16/901; G06F 16/90335; G06F 16/313; G06F 16/951
See application file for complete search history.

(56) References Cited

U.S. PATENT DOCUMENTS

| | | |
|---|---|---|
| 8,209,724 B2 | 6/2012 | Rathod et al. |
| 2008/0201304 A1 | 8/2008 | Sue |

(Continued)

FOREIGN PATENT DOCUMENTS

| | | |
|---|---|---|
| CN | 101641694 A | 2/2010 |
| CN | 102945253 A | 2/2013 |

(Continued)

OTHER PUBLICATIONS

International Search Report (in English and Chinese) and Written Opinion of the International Searching Authority (in Chinese) issued in PCT/CN2016/113588, dated Mar. 14, 2017; ISA/CN.

(Continued)

*Primary Examiner* — Paul Kim
(74) *Attorney, Agent, or Firm* — Greenblum & Bernstein, P.L.C.

(57) ABSTRACT

A method of pushing information is provided. According to an example, a search server obtains a natural search list including a first threshold number of natural search materials and a first evaluation score of each of the natural search materials by invoking a natural search service to perform a search operation on a search word, obtains a push information list including a second threshold number of push materials and a second evaluation score of each of the push materials by invoking a push information search service to perform a search operation on a search word, integrates the first evaluation score and the second evaluation score of a material existing in the natural search list and the push information list at the same time, re-ranks the natural search (Continued)

materials according to integrated evaluation scores, and pushes re-ranked natural search materials.

12 Claims, 6 Drawing Sheets

(51) Int. Cl.
*G06F 16/901* (2019.01)
*G06F 16/903* (2019.01)
*G06F 16/31* (2019.01)

(56) References Cited

U.S. PATENT DOCUMENTS

| | | | | |
|---|---|---|---|---|
| 2016/0034463 A1* | 2/2016 | Brewer | ............... | G06F 16/9024 707/734 |
| 2016/0034583 A1* | 2/2016 | Agarwal | ........... | G06F 16/24578 707/706 |

FOREIGN PATENT DOCUMENTS

| | | |
|---|---|---|
| CN | 103412881 A | 11/2013 |
| CN | 104516887 A | 4/2015 |
| CN | 104834698 A | 8/2015 |
| CN | 104881484 A | 9/2015 |
| CN | 105701216 A | 6/2016 |
| EP | 2131290 A1 | 12/2009 |

OTHER PUBLICATIONS

State Intellectual Property Office of the People's Republic of China, Office Action and Search Report Issued in Application No. 201610022317.4, dated Oct. 17, 2016, 5 pages with English translation.

* cited by examiner

METHOD AND DEVICE FOR PUSHING INFORMATION

CROSS REFERENCE TO RELATED APPLICATIONS

This application is a 371 National Phase of PCT/CN2016/113588 filed Dec. 30, 2016 and published in Chinese as WO 2017/121251 A1 on Jul. 20, 2017, which claims the benefit of Chinese Patent Application No. 201610022317.4, entitled "METHOD AND DEVICE FOR PUSHING INFORMATION", and filed on Jan. 13, 2016. The entire disclosures of the above applications are incorporated herein by reference.

TECHNICAL FIELD

The present disclosure relates to the field of computer technology, and in particular relates to a method and a device for pushing information.

BACKGROUND

With the development of Internet technology, more and more users use search engines. An Internet user may obtain different information through a search engine, and thus the search engine almost becomes a portal for netizens to access the Internet. Therefore, due to a large number of users of the search engine, more and more enterprises may push information, such as, advertising information and website links, through the search engine. A common method of pushing information based on search is to push information that has a push identifier and relates to a search word based on the search word, so as to advance a search ranking.

SUMMARY

The technical problem to be solved in the present disclosure is to provide a method of pushing information, so as to solve a problem in the prior art that push information appears in a fixed position of a search result, and relevance between the push information and a search word is much worse than relevance between a natural search result nearby the search word and the search word, thereby leading to a lower click rate of the search result.

To solve the above technical problem, examples of the present disclosure provide a method of pushing information, which includes: obtaining a natural search list by invoking a natural search service to perform a search operation on a search word; obtaining a push information list by invoking a push information search service to perform the search operation on the search word; where the natural search list includes a first threshold number of natural search materials and a first evaluation score of each of the natural search materials, the push information list includes a second threshold number of push materials and a second evaluation score of each of the push materials; obtaining an integrated evaluation score of each of the natural search materials in the natural search list by integrating the first evaluation score and the second evaluation score of a material existing in the natural search list and the push information list at the same time; re-ranking the natural search materials in the natural search list according to the integrated evaluation scores; and pushing re-ranked natural search materials.

Obtaining the natural search list by invoking the natural search service to perform the search operation on the search word further includes: invoking the natural search service; acquiring natural search materials; selecting the first threshold number of natural search materials according to text relevance; ranking the first threshold number of natural search materials according to ranking scores by a preset ranking method; and taking the ranking score of each of the natural search materials as the first evaluation score.

In a specific implementation, the preset ranking method is obtained by training collected data associated with a user experience index in a search log.

Obtaining the push information list by invoking the push information search service to perform the search operation on the search word further includes: invoking the push information search service; acquiring push materials; selecting the second threshold number of push materials according to text relevance; and respectively calculating second evaluation scores of the second threshold number of push materials according to a preset push evaluation parameter and a score weight of the push evaluation parameter.

In a specific implementation, respectively calculating the second evaluation scores of the second threshold number of push materials according to the preset push evaluation parameter and the score weight of the push evaluation parameter includes: obtaining the score weight of the push evaluation parameter of the push material corresponding to the search word; and taking a product obtained by multiplying the push evaluation parameter of the push material with the score weight as the second evaluation score of the push material.

In an example, the method further includes: optimizing and updating the score weight of the push evaluation parameter of the push material corresponding to the search word according to a search log under a constraint of a preset user experience index.

Correspondingly, examples of the present disclosure further provides a device for pushing information, the device includes a processor which invokes machine readable instructions corresponding to a control logic for pushing information stored on a storage medium and executes the machine readable instructions to: obtain a natural search list by invoking a natural search service to perform a search operation on a search word; obtain a push information list by invoking a push information search service to perform the search operation on the search word; where the natural search list includes a first threshold number of natural search materials and a first evaluation score of each of the natural search materials, the push information list includes a second threshold number of push materials and a second evaluation score of each of the push materials; obtain an integrated evaluation score of each of the natural search materials in the natural search list by integrating the first evaluation score and the second evaluation score of a material existing in the natural search list and the push information list at the same time; re-rank the natural search materials in the natural search list according to the integrated evaluation scores; and push re-ranked natural search materials.

In a specific implementation, when obtaining the natural search list by invoking the natural search service to perform the search operation on the search word, the machine readable instructions cause the processor to: invoke the natural search service; acquire natural search materials; select the first threshold number of natural search materials according to text relevance; rank the first threshold number of natural search materials according to ranking scores by a preset ranking method; and take the ranking score of each of the natural search materials as the first evaluation score.

In a specific implementation, the preset ranking method is obtained by training collected data associated with a user experience index in a search log.

In a specific implementation, when obtaining the push information list by invoking the push information search service to perform the search operation on the search word, the machine readable instructions cause the processor to: invoke the push information search service; acquire push materials; select the second threshold number of push materials according to text relevance; and respectively calculate second evaluation scores of the second threshold number of push materials according to a preset push evaluation parameter and a score weight of the push evaluation parameter.

In a specific implementation, when respectively calculating the second evaluation scores of the second threshold number of push materials according to the preset push evaluation parameter and the score weight of the push evaluation parameter, the machine readable instructions cause the processor to: obtain the score weight of the push evaluation parameter of the push material corresponding to the search word; and take a product obtained by multiplying the push evaluation parameter of the push material with the score weight as the second evaluation score of the push material.

In an example, the machine readable instructions further cause the processor to: optimize and update the score weight of the push evaluation parameter of the push material corresponding to the search word according to a search log under a constraint of a preset user experience index.

In the present disclosure, a search server may obtain a natural search list including the first threshold number of natural search materials and the first evaluation score of each of the natural search materials by invoking the natural search service to perform a search operation on a search word. The search server may obtain a push information list including the second threshold number of push materials and the second evaluation score of each of the push materials by invoking the push information search service in parallel to perform a search operation on the search word. Then, an integrated evaluation score of a material in the natural search list is obtained by integrating the first evaluation score and the second evaluation score of the material existing in the natural search list and the push information list at the same time, and the integrated evaluation scores of other materials only existing in the natural search list are respectively equal to the corresponding first evaluation scores. Finally, the natural search materials are re-ranked according to the integrated evaluation scores, and then pushed. By integrating the second evaluation scores of the materials in the push information list, a pushing position of a search result with push attribute in the natural search list is advanced. In this way, accuracy of the search result and the click rate of the search result with push attribute can be ensured, thereby improving the user experience.

DETAILED DESCRIPTION OF THE EMBODIMENTS

The technical solutions in examples of the present disclosure will be described clearly and fully below in combination with drawings in the examples of the present disclosure. It is apparent that the described examples are merely part of examples of the present disclosure rather than all examples. Other examples obtained by those of ordinary skill in the art based on the examples in the present disclosure without paying creative work shall all fall into the scope of protection of the present disclosure.

A method of pushing information may be that, after receiving a search word from a Web page or a terminal application program, a search server invokes a natural search service and a push information search service respectively by using the search word as an input parameter. The natural search service may acquire search materials based on the search word and rank the search materials in a descending order of scores assigned to ranking parameters, such as, relevance with the search word, a user click feedback rate and so on, to obtain a natural search result list. The push information search service may acquire push materials based on the search word, rank the push materials based on relevance with the search word to screen out a preset number of push materials with relatively high relevance, calculate push scores for the screened-out preset number of push materials based on a preset push parameter, and rank the screened-out preset number of push materials in a descending order of scores to obtain a push information list. The search server pushes the former N (N is a positive integer) pieces of push information in the push information list and natural search results respectively to a preset fixed position of the Web page or the terminal application program for displaying.

The method of pushing information may have following defects: push information appears in a fixed position of a search result, there may be a case that relevance between the push information and a search word is much worse than relevance between a natural search result nearby the search word and the search word, which is intuitively expressed as an incorrect search result, thereby leading to a lower click rate of the search result.

Information push may include a case that after a search word input by a user is received, searched relevant information is pushed to the user. Information push may further include a case that information is actively pushed to a user without receiving any trigger from the user. The present disclosure is applicable to the case that after a search word input by a user is received, relevant information is pushed. Information which is pushed in the present disclosure may include a web site link, a notice, an advertisement and the like, which is not limited herein. Different information which is pushed may correspond to different push information search services. Each of the push information search services may perform a search in a corresponding push database according to a search word sent by a front end page. The push information search services may adopt a same search method and may also adopt different search methods based on different push strategies, which is not limited herein. In an example of the present disclosure, for convenience of understanding, the method of pushing information in the present disclosure is described by adopting a common application scenario for pushing an advertisement.

The natural search service in an example of the present disclosure refers to that a program module or hardware for implementing a natural search in a search engine is configured to obtain a matching page that is most relevant to a search request in the search engine. The push information search service refers to that a program module or hardware for implementing a non-natural search in a search engine is configured to obtain push information that is associated with a search request and satisfies a preset push rule in the search engine. Searched objects in an example of the present disclosure may be referred to as "materials" including a website, different webpage contents and the like, such as business information on a website, a product introduction, an article, a picture, a website address and the like.

Figure 1:
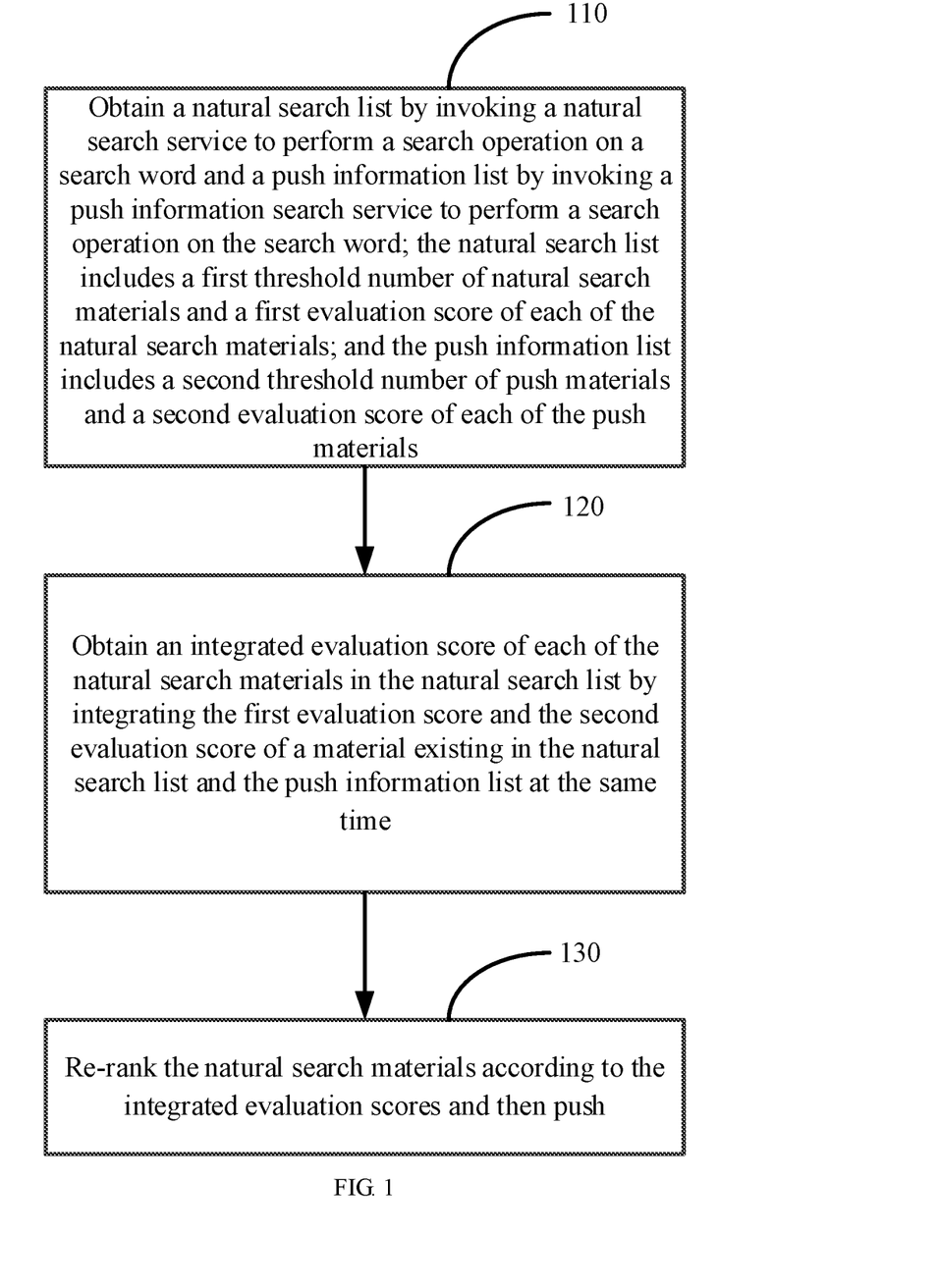
FIG. 1 is a flowchart illustrating a method of pushing information according to an example of the present disclosure.

As shown in FIG. 1, a method of pushing information in the present disclosure may include steps 110-130.

At step 110, a natural search list is obtained by invoking a natural search service to perform a search operation on a search word; a push information list is obtained by invoking a push information search service to perform a search operation on the search word; the natural search list may include a first threshold number of natural search materials and a first evaluation score of each of the natural search materials; and the push information list may include a second threshold number of push materials and a second evaluation score of each of the push materials.

At step 120, an integrated evaluation score of each of the natural search materials in the natural search list is obtained by integrating the first evaluation score and the second evaluation score of a material existing in the natural search list and the push information list at the same time.

At step 130, the natural search materials are re-ranked according to the integrated evaluation scores, and then pushed.

In an example of the present disclosure, a search server may invoke the natural search service and the push information service.

Before step 110, the method of pushing information in the present disclosure may also include a step for receiving the search word. For example, a user may input a search word via an input interface of a Web page or an application (APP) program, and then the search word input by the user may be sent to a search server through the Web page or the application program. After receiving the search word from a front end, the search server may perform the subsequent steps 110 to 130 to complete a search according to the search word and information push operation associated with a corresponding search result. In a specific implementation, the search server may also receive the search word in another method. For example, in a navigation system, when a geographical position is changed, a screening function of the navigation system may take the current geographical position as a search word and send the search word to the search server, so as to implement a search.

At the above step 110, the search server may be one physical machine or a plurality of physical machines, which is not limited herein. The search server can invoke the natural search service and the push information search service in parallel and independently. At the above step 110, a search operation for a search word by invoking the natural search service and a search operation for the search word by invoking the push information service may be performed simultaneously or sequentially. The executing order of the two operations is not limited in the present disclosure. The search server may perform a search operation for an input search word by invoking the natural search service, and may obtain up to ten thousand search results based on different search words and different databases built in the search server. Further, the natural search service may obtain an evaluation score of each of the search results, where the evaluation score of each of the search results may be used to indicate a matching degree of the search result. To improve browsing efficiency, the search server may screen the search results according to the evaluation scores of the search results and select only a part of the search results for pushing. In an example of the present disclosure, a first threshold number of natural search results are selected for pushing, where the first threshold number may be determined according to receiving capacity or setting of a pushed terminal. For example, when the pushed terminal is a mobile terminal, the first threshold number may be set to 200. Similarly, the search server may perform a search operation for an input search word by invoking the push information search service, and may obtain up to one hundred pieces of push information based on different search words and different push information databases built in the search server. Further, the push information search service may obtain an evaluation score of each pieces of the push information, where the evaluation score of each pieces of the push information may be used to indicate a matching degree of the push information. According to receiving capacity of a pushed terminal, the search server may preset a maximum number of push information, then screen the push information according to the evaluation scores of the push information, and select only a part of the push information for pushing. In an example of the present disclosure, a second threshold number of push information may be selected for pushing, where the second threshold number may be for example, 10. The second threshold number may be less than the first threshold number.

Materials to be searched may be stored in a database of the search server, and may also be stored in a data server, and include natural search materials and push materials. Where push materials may also exist in the natural search materials, that is, part of the natural search materials have push attributes. Each material may be set with a unique material identifier, for example, a material identifier of a website may be a Uniform Resource Locator (URL) of the website. At the above step 120, the materials with push attributes existing in the natural search list may be obtained by determining whether the material identifiers in the natural search list exist in the push information list. In a specific implementation, the first threshold number of natural search materials may be traversed. When a push material corresponding to the natural search materials exist in the push information list, i.e. for a material with a push attribute in the natural search list, a sum between the first evaluation score of the material with the push attribute and the second evaluation score of the push material with the material identifier in the push information list is used as an integrated evaluation score of the natural search material; for a material without a push attribute in the natural search list, the first evaluation score of the material is used as an integrated evaluation score of the material.

Finally, at step 130, the natural search materials may be re-ranked according to the integrated evaluation scores, and then pushed according to a re-ranked order.

A specific solution of the present disclosure will be described below with "hotpot" searched on a client application of the Dazhong Dianping as an example. A user may input a search word "hotpot" on the client application of the Dazhong Dianping, the client application may send the search word "hotpot" to a search server after search is clicked, and the search server may then perform a search operation by invoking a natural search service and a push information search service respectively. In the natural search service, 100,000 materials may be obtained from a database, and then screened in a descending order of the first evaluation scores of the materials to obtain 10,000 materials with high scores and the 10,000 materials are then formed into a natural search list (e.g., Table 1). In the push information search service, 1000 materials may be obtained from a push information database, and then screened in a descending order of the second evaluation scores of the materials to obtain 100 materials with high scores and the 100 materials are then formed into a push information search list (e.g. Table 2).

TABLE 1

Natural Search List

| Material identifier | First evaluation score | Other |
|---|---|---|
| Old City Hotpot | 85 | — |
| Libuguan Chongqing Laozao Hotpot | 80 | — |
| Yangfang Shengli Boiled Meat | 79 | — |
| Yanyu Laozao Dazhou Hotpot | 70 | — |
| ... | ... | ... |

TABLE 2

Push Information List

| Material identifier | Second evaluation score | Other |
|---|---|---|
| Yanyu Laozao Dazhou Hotpot | 75 | — |
| Xiaoyutang | 60 | — |
| ... | ... | ... |

When materials in the natural search list are traversed, it is found that the material with the material identifier being "Yanyu Laozao Dazhou Hotpot" exists in the natural search list and the push information list at the same time. Thus, the integrated evaluation score of the material with the material identifier of "Yanyu Laozao Dazhou Hotpot" may be identified as 70+75=145, and the integrated evaluation scores of other materials that do not exist in the natural search list and the push information list at the same time are the first evaluation scores of the materials in the natural search list. By integrating the second evaluation scores, the materials in the natural search list are re-ranked in a descending order of the integrated evaluation scores, as shown in Table 3.

TABLE 3

Re-ranked Natural Search List

| Material identifier | Integrated evaluation score | Other |
|---|---|---|
| Yanyu Laozao Dazhou Hotpot | 145 | — |
| Old City Hotpot | 85 | — |

TABLE 3-continued

Re-ranked Natural Search List

| Material identifier | Integrated evaluation score | Other |
|---|---|---|
| Libuguan Chongqing Laozao Hotpot | 80 | — |
| Yangfang Shengli Boiled Meat | 79 | — |
| ... | ... | ... |

Then, the natural search list may be pushed to the client application of the Dazhong Dianping according to the re-ranked order.

The above tables and data are used only as an example to help a reader to understand the present disclosure, and shall not be intended to limit the present disclosure. A search server in the present disclosure may obtain a natural search list including the first threshold number of natural search materials and the first evaluation score of each of the natural search materials by invoking the natural search service to perform a search operation on an input search word. Also, the search server may obtain a push information list including the second threshold number of push materials and the second evaluation score of each of the push materials by invoking the push information search service in parallel to perform a search operation on the input search word. Then, an integrated evaluation score of a material in the natural search list is obtained by integrating the first evaluation score and the second evaluation score of the material existing in the natural search list and the push information list at the same time, and the integrated evaluation scores of other materials only existing in the natural search list are respectively equal to the corresponding first evaluation scores. Finally, the natural search materials are re-ranked according to the integrated evaluation scores, and then pushed. By integrating the second evaluation scores of the materials in the push information list, a pushing position of a search result with push attribute in the natural search list is advanced. In this way, accuracy of the search result and the click rate of the search result with push attribute can be ensured, thereby improving the user experience.

Figure 2:
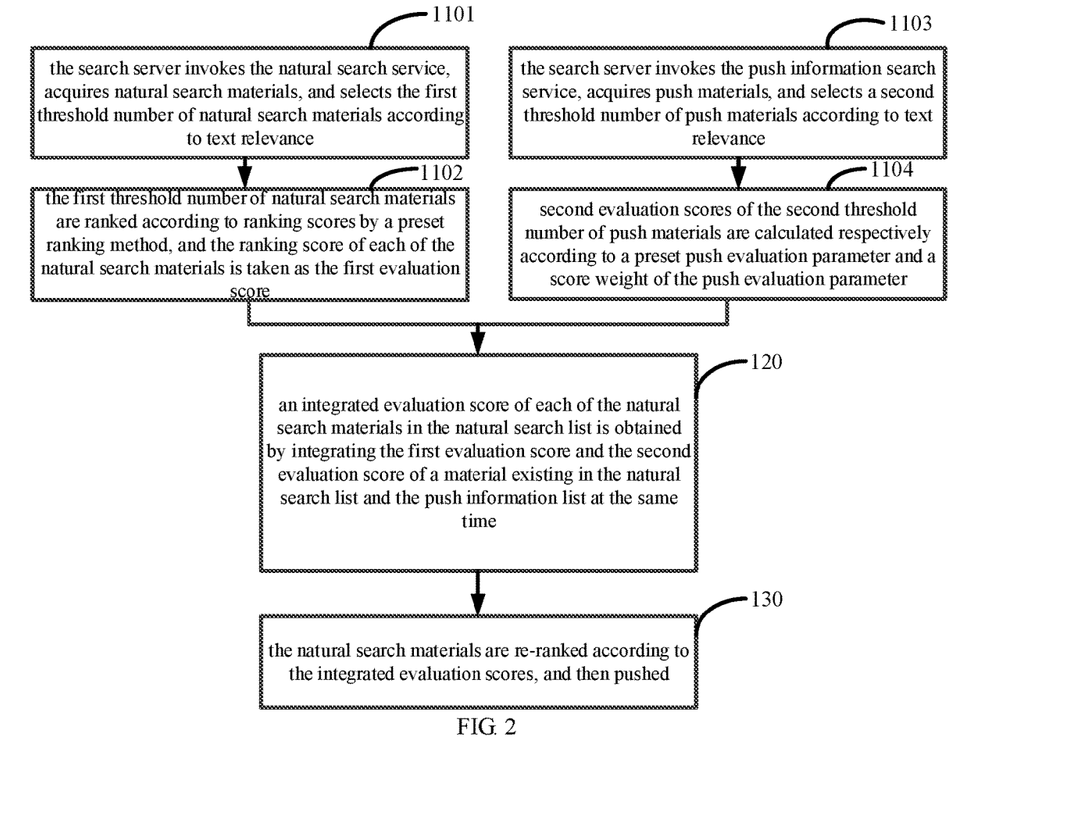
FIG. 2 is a flowchart illustrating a method of pushing information according to another example of the present disclosure.

In an example of the present disclosure, as shown in FIG. 2, the search server obtains the natural search list by invoking the natural search service to perform the search operation on the search word, which further includes step 1101 and step 1102.

At step 1101, the search server invokes the natural search service, acquires natural search materials, and selects the first threshold number of natural search materials according to text relevance.

At step 1102, the first threshold number of natural search materials are ranked according to ranking scores by a preset ranking method, and the ranking score of each of the natural search materials is taken as the first evaluation score.

The search server may invoke the natural search service to acquire the natural search materials. After obtaining massive materials from a database, the search server may rank the massive materials by a simple ranking method, for example, in a descending order of text relevance, or in an ascending order of text relevance. Then, the search server may screen the massive materials, select the first threshold number of materials with high relevance as natural search materials to be returned, and add the first threshold number of materials into the natural search list. The score of text relevance may be obtained by calculating a term frequency-inverse document frequency (tf-idf) value between the search word and a material title based on a tf-idf algorithm.

If the obtained massive materials are ranked in a descending order of text relevance, the search server may select the former first threshold number of materials as natural search materials to be returned, and add the former first threshold number of materials into the natural search list. If the obtained massive materials are ranked in an ascending order of text relevance, the search server may select the latter first threshold number of materials as natural search materials to be returned, and add the latter first threshold number of materials into the natural search list.

Then, at step 1102, the search server re-ranks the screened-out first threshold number of natural search materials by a preset ranking method. During implementation of the preset ranking method, a re-ranked first threshold number of natural search materials are output in a descending order of ranking scores. The ranking score of each of the first threshold number of natural search materials is taken as the first evaluation score of the corresponding material.

In a specific implementation, a complex ranking algorithm including LearningToRank, PageRank, or the like may be used as the preset ranking method. When the ranking method is trained, a user experience is used as an optimization goal. Therefore, the preset ranking method may be obtained by training collected data associated with a user experience index in a search log. The data associated with the user experience index may include, but not limited to, a click count and text relevance. In an example of the present disclosure, by the preset ranking method, ranking scores reflecting a user experience are obtained as the first evaluation scores of natural search results. In this example, a training process of the ranking method may be described by a common complex ranking method, that is, a Ranking SVM (Support Vector Machine) method of pairwise.

Firstly, a query log of a natural search on a back end is collected. The query log on the back end may be stored on a search server. The query log may include: a unique query identifier (queryid), a city, a query category, a geohash, a search word, a natural search list di (material id), a text relevance score (ti), a category relevance score (ci) and the like. The text relevance score may be obtained by calculating a tf-idf value between a search word and a material title based on the tf-idf algorithm. The category relevance score may be obtained by calculating a similarity between a query category and a material category based on a cosine similarity algorithm, which is used as category relevance.

Then, a click log of a natural search list of a user on a front end is collected and the click log may include: a unique query identifier (queryid) and a natural search list di (material id).

Next, training data of a ranking method is generated according to the query log of the natural search on the back end and the click log of the natural search list on the front end. A format of each pieces of training data may be (a label, a queryid, a city, a query category, a geohash, a search word, a ti, and a ci), where the queryid, the city, the query category, the geohash, the search word, the ti and the ci are from the query log of the natural search on the back end, the ti represents the text relevance between the material di and the search word, the ci represents the category similarity between the material di and the query category, and a label value may be set according to a user click count corresponding to each query log of the natural search on the back end.

The label value of the training data may be set according to the user click count corresponding to each query log of the natural search on the back end, which specifically includes: associating the query log of the natural search on the back end and the click log of the natural search list on the front end with each other via queryid; for each query log of the natural search on the back end, determining one or more associated click logs (queryid, di) of a natural search list from all front end user; and calculating the user click count. Each query log of the natural search on the back end is unfolded into N pieces of training data, where N is equal to a number of materials in the natural search list. Assuming that there is a count number of user clicks in a query log of the natural search on the back end, where the count is equal to or greater than 0. If the count is equal to 0, the label value of each pieces of training data is equal to 0; if the count is greater than 0, the material id in the query log of the natural search on the back end is traversed, the label value of the first clicked material is equal to the count, the label value of the second clicked material is equal to count−1, and the label value of the i-th clicked material is equal to count+1−i. Where i is equal to or less than the count, and the label values of other un-clicked materials are equal to 0.

Finally, the above training data is learned with the machine learning method Ranking SVM of pairwise to train a complex ranking model and generate a model parameter file. Thus, the training of the ranking method is completed.

After acquiring natural search materials and screening out the first threshold number of natural search materials according to text relevance, the natural search service may generate a corresponding ranking input parameter (queryid, city, query category, geohash, search word, ti and ci) for each material, and load the model parameter file obtained by training with Ranking SVM to calculate a score corresponding to each material, and all the materials are ranked in a descending order of scores. Thus, the complex ranking is completed. The score corresponding to each material is used as the first evaluation score of the material.

In a specific implementation, features of training data used in the above Ranking SVM method may include more, or a more complex training method may be used. The specific training method and training data of the ranking method are not limited in the present disclosure. In an example of the present disclosure, a ranking model is trained by introducing features (such as text relevance and a click count) associated with a user experience index, so that the returned natural search results can more satisfy the user experience.

In an example, a first round of ranking may be performed for natural search results by a simple ranking method and then screening is performed for the natural search results to reduce the number of the search results, thereby improving the pushing efficiency. The screened-out natural search results are re-ranked by a preset ranking method. A ranking factor in which the search server is interested may be introduced in the preset ranking method to increase relevance of the natural search results and further improve the user experience.

In another specific example of the present disclosure, as shown in FIG. 2, the search server obtains a push information list by invoking a push information search service to perform a search operation on an input search word, which further includes step 1103 and step 1104.

At step 1103, the search server invokes the push information search service, acquires push materials, and selects a second threshold number of push materials according to text relevance.

At step 1104, second evaluation scores of the second threshold number of push materials are calculated respectively according to a preset push evaluation parameter and a score weight of the push evaluation parameter.

In a specific implementation, the search server may invoke the push information search service to acquire the push materials. After obtaining massive materials from a push database, the search server may screen the massive materials by a simple ranking method, for example, in a descending order of text relevance or in an ascending order of text relevance. The search server may select the second threshold number of materials with high relevance as materials to be pushed, and add the materials to be pushed into the push information list. During a specific implementation, a score of text relevance may be obtained by calculating a tf-idf value between the search word and a material title based on the tf-idf algorithm. If the obtained massive materials are ranked in a descending order of text relevance, the former second threshold number of materials are selected as materials to be pushed, and added into the push information list; if the obtained massive materials are ranked in an ascending order of text relevance, the latter second threshold number of materials are selected as materials to be pushed, and added into the push information list.

Then, the second evaluation scores of the second threshold number of push materials may be calculated respectively according to the preset push evaluation parameter and the score weight of the push evaluation parameter. The score weight $\lambda$ of the push evaluation parameter may be preset according to experiences. During the specific implementation, a process of calculating the second evaluation score may include: firstly, acquiring the score weight $\lambda$ of the push evaluation parameter of the push material corresponding to the search word; and then, taking a product obtained by multiplying the push evaluation parameter of the push material with the score weight $\lambda$ as the second evaluation score of the push material. The push evaluation parameter of the material represents an index for measuring a push effect of the material of this category. The push evaluation parameters of push materials of different categories are slightly different. Taking pushing a advertising material as an example, the push evaluation parameter of the advertising material is effective cost per mille (eCPM) of the advertisement, which refers to an advertising revenue or a click rate obtained by displaying every thousand times. The push evaluation parameter of the push material may be pre-defined, and the score weight of the push evaluation parameter is stored in the search server and can be obtained by performing offline calculation according to a search log.

Taking a push material as an advertising material as an example, steps for respectively calculating the second evaluation scores of the second threshold number of push materials according to the preset push evaluation parameter and the score weight of the push evaluation parameter will be described in detail as follows. Assuming that the preset push evaluation parameter is eCPM of the advertising material, the eCPM of the advertising material may be calculated according to a formula of eCPM=CTR*Bid, where the CTR represents a probability that a user clicks on an advertisement, and the Bid refers to an advertising bid. In a push database, each advertising material includes information such as CTR and Bid, where a Bid as a basic attribute (a one-click bid of an advertiser) of an advertisement may be a preset numerical value; and the CTR may be obtained according to a dynamic calculation. The dynamic calculation for obtaining the CTR may be implemented by a calculation model in the prior art, which will not be described herein. The search server may read the score weight $\lambda$ of the push evaluation parameter, and calculate the second evaluation score AdScore of the advertising material according to a formula of AdScore=$\lambda$*CTR*Bid.

In this example, only taking the advertising material as an example, the step for respectively calculating the second evaluation score of the second threshold number of push materials according to the preset push evaluation parameter and the score weight of the push evaluation parameter is described in detail. The push materials of the present disclosure are not limited to advertising materials, the evaluation parameter of the push materials is also not limited to eCPM of the advertising materials, and the method of calculating the second evaluation score is also not limited to the above formula. The above specific example should not be intended to limit the present disclosure.

In this example, a first round of ranking may be performed for the natural search results by a simple ranking method and then screening is performed for the natural search results, thereby reducing the number of search results and improving the pushing efficiency. By calculating the second evaluation scores of the push materials with the score weight of the push evaluation parameter, ranking positions of the materials with push attributes in the returned natural search list may be dynamically balanced, thereby further improving the user experience.

If the effect of pushing information is not considered, $\lambda$ may be set to 0. If the effect of pushing information and the user experience of the natural search results are both considered, it is desired to set $\lambda$ in combination with the first evaluation score and the evaluation parameter of the push material. A specific method of setting the score weight $\lambda$ of the push evaluation parameter may include: collecting query logs; classifying the collected query logs according to a service rule; and calculating the score weight $\lambda$ of the push evaluation parameter based on a batch gradient descent algorithm by taking logs in each category as a sample. A query log is generated in each search process, and the query log in each search process is recorded in a list. For example, a list is generated for a log of searching "hotpot" in Dongzhimen by you, and another list is generated for a log of searching "hotpot" in Xizhimen by me; still another list is generated for a log of searching "hotpot" in Dongzhimen by me. One list may correspond to one search. Each list includes query conditions such as a unique query identifier, a city, a query category, a geohash, and a search word, and also includes different information such as query time, all results returned to a user (i.e., a natural search list ranked according to integrated evaluation scores), a push information list, a natural search list ranked according to the first evaluation scores, a ranking factor and so on. The natural search list also includes: a material identifier and a first evaluation score of a material; the push information list also includes a push evaluation parameter of a push material. Then, the query logs may be classified according to the service rule. The query logs may be classified by an element classification method, for example, a classification method of a city, a category, a geohash and a search word. Finally, the score weight $\lambda$ of the push evaluation parameter may be calculated based on a batch gradient descent algorithm by taking logs in each category as a sample.

A specific method of setting the score weight $\lambda$ of the push evaluation parameter is described in detail below in combination with an example of pushing an advertisement in a content search. It is assumed that push evaluation parameters of an advertising material are a probability (CTR) that a user clicks on an advertisement and an advertising bid (Bid); and a ranking factor of a natural search material is a user experience score RelevanceScore. A search server or a log server of a search system may record query logs, i.e. a log of each search. The log of each search is recorded in one list. The list includes different information such as query time, all results returned to a user (i.e., a natural search list ranked according to integrated evaluation scores), a push information list, a natural search list ranked according to the first evaluation scores, and a ranking factor. The natural search list ranked according to the first evaluation scores may further include: a material identifier id and a first evaluation score RelevanceScore of a material; the push information list may further include push evaluation parameters CTR and Bid of a push material.

Then, the query logs are classified according to a service rule, for example, collected query logs may be classified by a classification method of a city, a category, a geohash and a search word to obtain a plurality of categories, where each category further contains a plurality of lists for recording the query logs.

Figure 3:
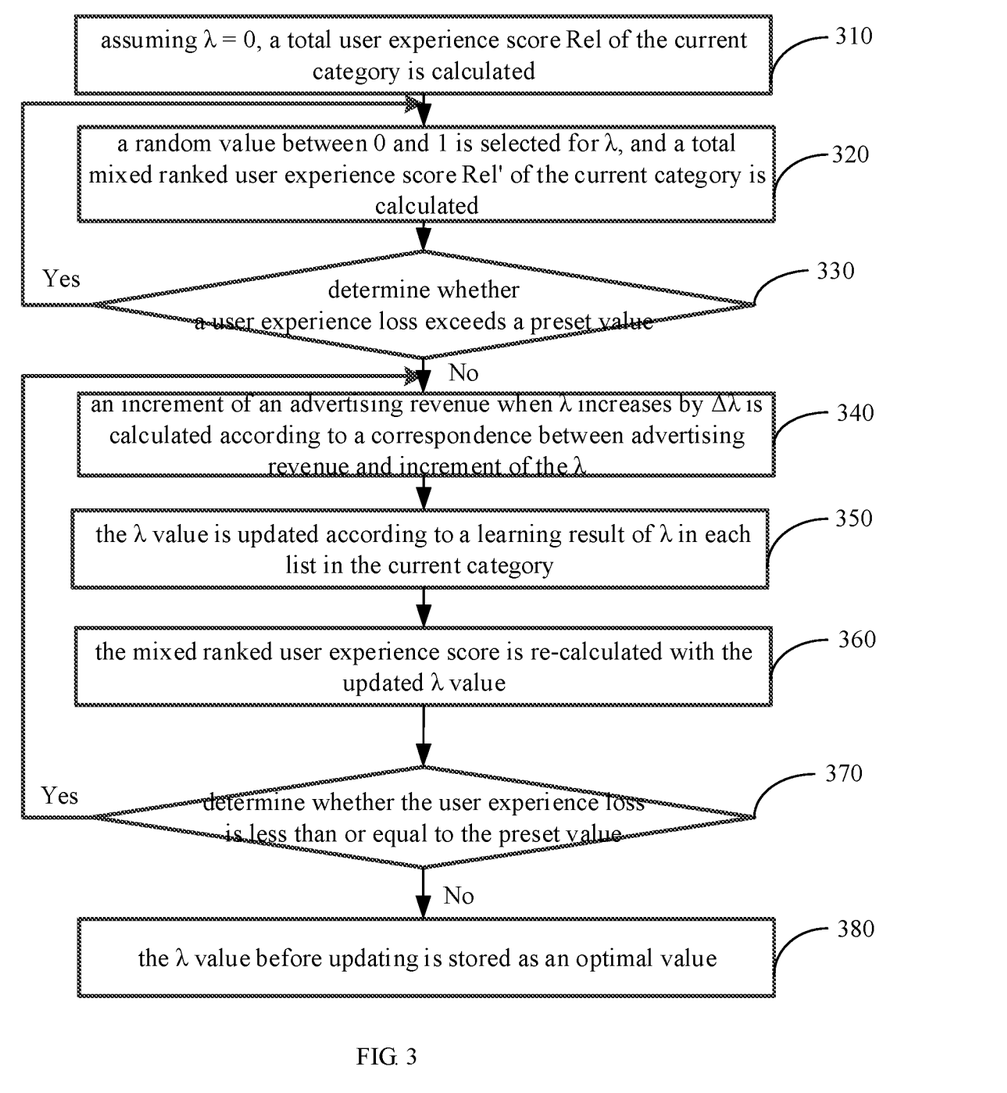
FIG. 3 is a flowchart illustrating calculating a score weight of a push evaluation parameter according to an example of the present disclosure.

Finally, the score weight λ of the push evaluation parameter is calculated based on the batch gradient descent algorithm by taking the query logs in each category as a sample. As shown in FIG. 3, the specific method of calculating the score weight λ of the push evaluation parameter based on the batch gradient descent algorithm may include step 310 to step 380.

At step 310, assuming that K number of lists are included in a current category, a total user experience score Rel of the current category is calculated. Firstly, it is assumed λ=0, materials in each list in the current category are ranked in a descending order of RelevanceScore. A user experience score Reli of the materials in the former M positions in each list is calculated. Reli=RelevanceScore1+RelevanceScore2+ RelevanceScorei+ . . . +RelevanceScorem. The total user experience score Rel of this category is Rel=Rel1+ Rel2+ . . . +Reli+ . . . +Relk.

At step 320, a random value between 0 and 1 is selected for λ, and a total mixed ranked user experience score Rel' of the current category is calculated. Firstly, a random value between 0 and 1 is selected for λ, an integrated evaluation score RankScore of each material in each list in the current category is calculated according to a formula as follows:

RankScore=RelevanceScore+λ*CTR*Bid, and each material in each list is ranked in a descending order of RankScore. Then, a mixed ranked user experience score Rel'i in the former M positions in each list is calculated. Rel'i=RankScore1+RankScore2+RankScorei+ . . . +RankScorem. The total mixed ranked user experience score Rel' of this category is Rel'=Rel'1+Rel'2+ . . . +Rel'i+ . . . +Rel'k.

At step 330, whether a user experience loss exceeds a preset value is determined. If yes, step 320 is repeated to reset a λ value; otherwise, a step for optimizing the λ value is continued. The user experience loss is equal to (Rel−Rel')/Rel, and a target value of the user experience loss is preset to X %. If (Rel−Rel')/Rel is greater than X %, it is determined that the user experience loss exceeds the preset target value, and it is desired to re-estimate the λ value. Otherwise, it is determined that the user experience loss is lower than the preset target value, and the λ value is further optimized under this condition.

At step 340, an increment of an advertising revenue when λ increases by Δλ is calculated according to a correspondence between advertising revenue and increment of the λ. The advertising revenue (Revenue) is a function of RankScore, which is expressed as g(RankScore) and can be calculated based on the following formula:

Revenue=g(RankScore)=g(RelevanceScore+ λ*CTR*Bid).

For each list, a partial derivative $$\frac{\partial g}{\partial \lambda}$$

of the advertising revenue g(λ) with respect to λ is calculated respectively. A calculation method may include: a tiny amount Δλ for λ is increased and an increment ΔRev of the advertising revenue is calculated, which can be expressed as $$\frac{\partial g}{\partial \lambda} = \frac{\Delta Rev}{\Delta \lambda}.$$

At step 350, the λ value is updated according to a learning result of λ in each list in the current category. The λ value may be updated based on the following formula:

$$\lambda = \lambda + \alpha \sum_{i}^{K} \frac{\partial g}{\partial \lambda_i},$$

where α is a learning speed parameter that can be manually optimized according to a learning effect and a learning speed, and K is a number of lists in the current category.

At step 360, the mixed ranked user experience score is re-calculated with the updated λ value. The integrated evaluation scores RankScore of the materials in each list in the current category are re-calculated with the updated λ value, and the materials in each list are ranked in a descending order of RankScore. Then, the total mixed ranked user experience score Rel' of the category are further calculated by selecting the mixed ranked user experience scores of the former M positions in each list. The specific method may be referred to step 320, which will not be described herein.

At step 370, whether the user experience loss is less than or equal to the preset value is determined. If yes, step 340 to step 360 may be repeated to continue optimizing the λ value; otherwise, step 380 is performed. It is determined whether a constraint of (Rel−Rel')/Rel≤X % is satisfied with the updated total mixed ranked user experience score Rel'. If yes, step 340 to step 360 are repeated to continue optimizing the λ value.

At step 380, the λ value before updating is stored as an optimal value. When it is determined that the current λ value is too large, the λ value before updating at step 350 is stored as the optimal value of the score weight of the push evaluation parameter corresponding to materials in the category, and used to calculate the second evaluation score.

By maximizing the λ value under a constraint of a particular user experience loss, the score weight of the push evaluation parameter may be maximized under the set constraint of the user experience loss, thereby maximizing the advertising revenue. In this example, descriptions are made only with push information as an advertisement, but the application scope of the present disclosure is not limited to pushing an advertisement. It is understood that the method of the present disclosure may also be used to push other information. When different information is pushed, it is only desired to perform a corresponding adjustment to the calculation formula based on a change of g(λ) without changing an idea of optimizing a λ value.

Figure 4:
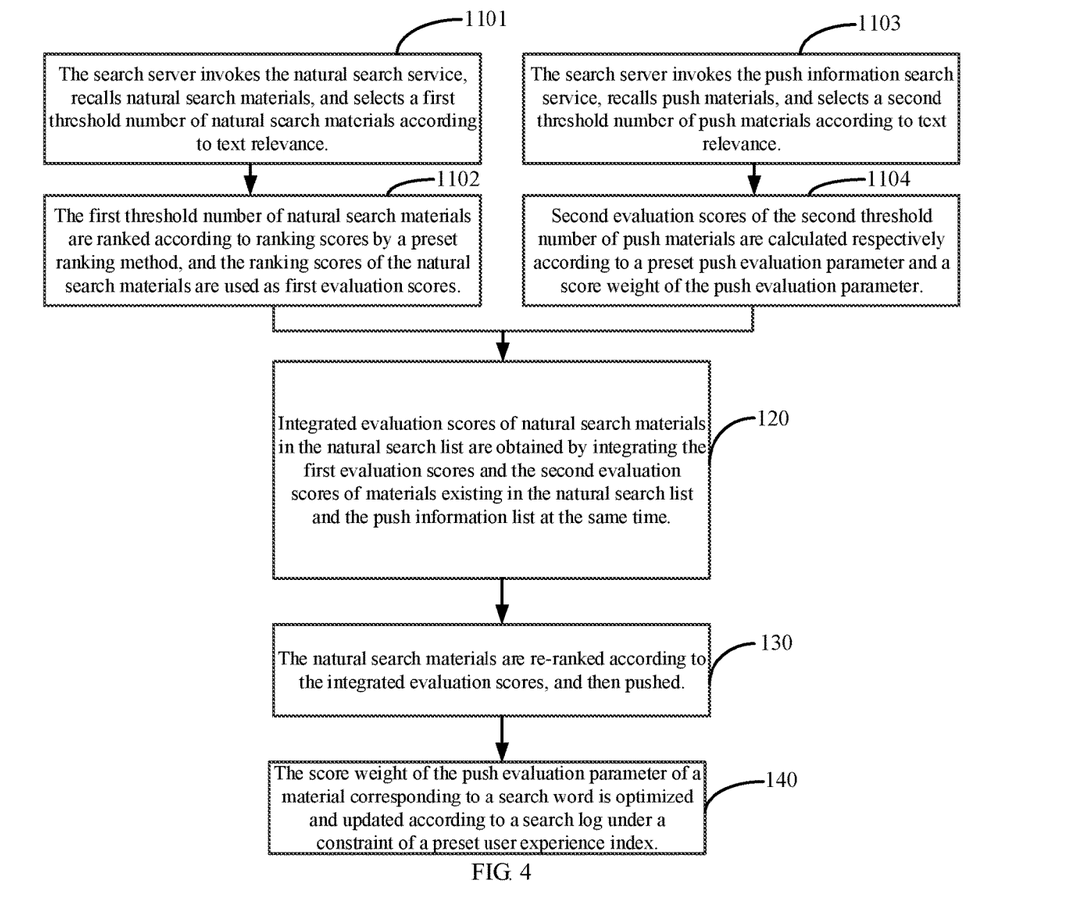
FIG. 4 is a flowchart illustrating a method of pushing information according to still another example of the present disclosure.

Based on the above example, in another preferred example of the present disclosure, as shown in FIG. 4, the method of pushing information may further include step 140.

At step 140, the score weight λ of the push evaluation parameter of materials corresponding to the search word is optimized and updated according to a search log under a constraint of a preset user experience index. The λ value for each category may be optimized based on an off-line batch gradient descent algorithm and then uploaded to a search system, and may also be optimized based on an online batch gradient descent algorithm and updated in real time.

By continuously optimizing the score weight λ of the push evaluation parameter, changes of search results caused by changes of different query time, query places and the like may be effectively balanced, so that the push information is always ranked in an appropriate position of a search result, thereby effectively improving the user experience, and ensuring a click rate of a search result with push attribute.

Figure 5:
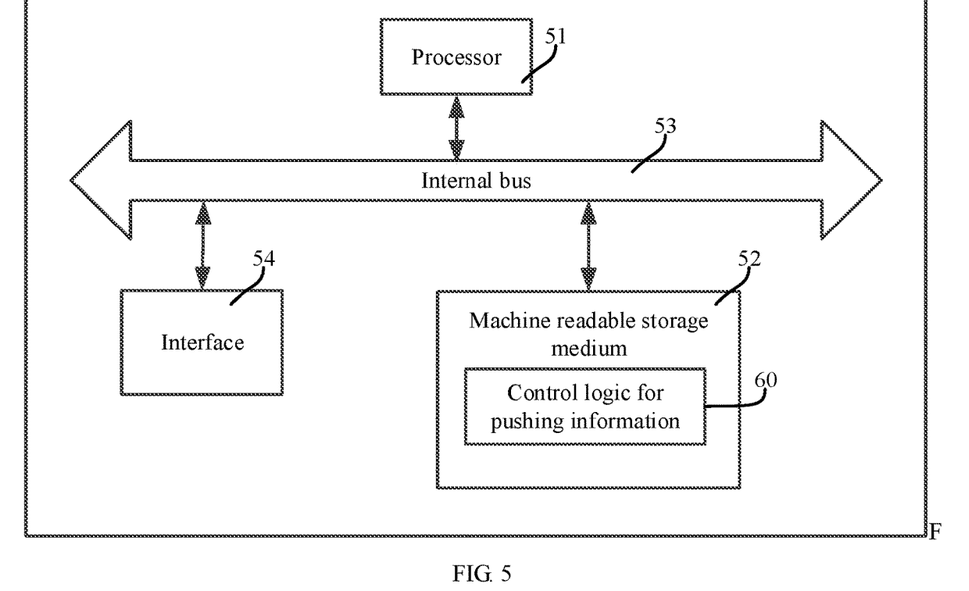
FIG. 5 is a schematic diagram illustrating a hardware structure of a device for pushing information according to an example of the present disclosure.

Correspondingly, the present disclosure further provides a device for pushing information. As shown in FIG. 5, the device for pushing information includes a processor 51 and a machine readable storage medium 52. Where, the processor 51 and the machine readable storage medium 52 are generally coupled to each other via an internal bus 53. In other possible implementations, the device for pushing information may also include an interface 54 to enable the device to communicate with other devices or components.

In different examples, the machine readable storage medium 52 includes RAM (Radom Access Memory), volatile memory, non-volatile memory, flash memory, storage drive (such as hard disk drive), solid state disk, any type of storage disk (such as optical disk, DVD, etc.), or the like Storage media, or a combination thereof.

Figure 6:
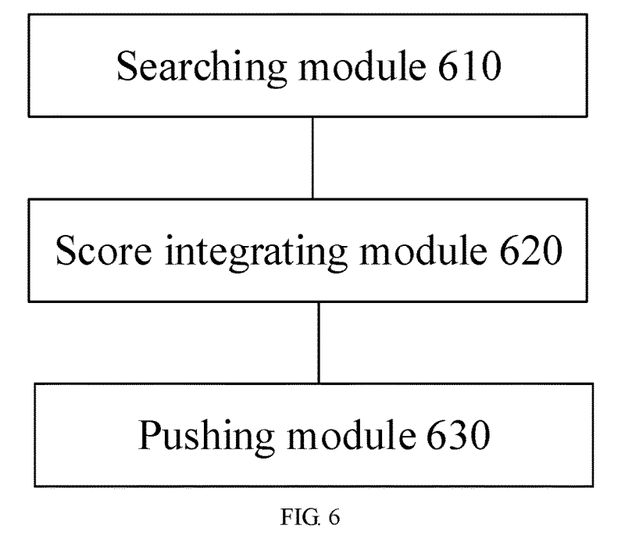
FIG. 6 is a schematic diagram illustrating a functional module of a control logic for pushing information according to an example of the present disclosure.

Further, the machine readable storage medium 52 may store machine readable instructions corresponding to a control logic 60 for pushing information. In this way, when reading the machine readable instructions stored on the machine readable storage medium 52, the processor 51 may perform the method of pushing information as described above. Functionally, as shown in FIG. 6, the control logic 60 may include a searching module 610, a score integrating module 620 and a pushing module 630.

The searching module 610 is configured to obtain a natural search list by invoking a natural search service to perform a search operation on a search word; and obtain a push information list by invoking a push information search service to perform the search operation on the search word. The natural search list includes a first threshold number of natural search materials and a first evaluation score of each of the natural search materials. The push information list includes a second threshold number of push materials and a second evaluation score of each of the push materials.

The score integrating module 620 is configured to obtain an integrated evaluation score of each of the natural search materials in the natural search list by integrating the first evaluation score and the second evaluation score of a material existing in the natural search list and the push information list at the same time.

The pushing module 630 is configured to re-rank the natural search materials in the natural search list according to the integrated evaluation scores and push re-ranked natural search materials.

In the present disclosure, the search server in the present disclosure may obtain a natural search list including the first threshold number of natural search materials and the first evaluation score of each of the natural search materials by invoking the natural search service to perform a search operation on an input search word. Meanwhile, the search server may obtain a push information list including the second threshold number of push materials and the second evaluation score of each of the push materials by invoking the push information search service in parallel to perform a search operation on the input search word. Then, an integrated evaluation score of a material in the natural search list is obtained by integrating the first evaluation score and the second evaluation score of the material existing in the natural search list and the push information list at the same time. Finally, the natural search materials in the natural search list are re-ranked according to the integrated evaluation scores, and then pushed. By integrating the second evaluation scores of the materials in the push information list, a pushing position of a search result with push attribute in the natural search list is advanced. In this way, accuracy of the search result and the click rate of the search result with push attribute can be ensured, thereby improving the user experience.

Figure 7:
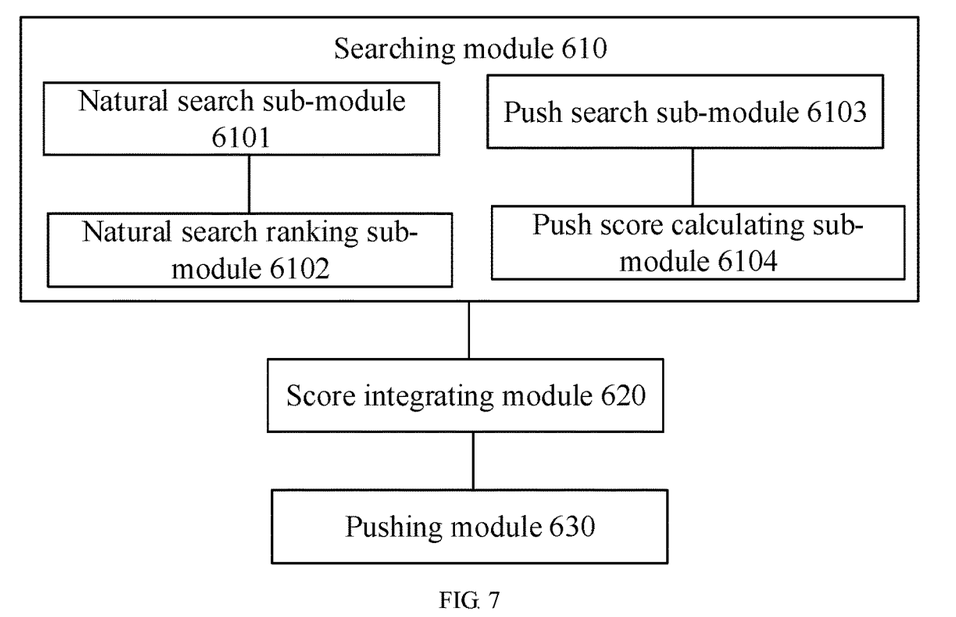
FIG. 7 is a schematic diagram illustrating a functional module of a control logic for pushing information according to another example of the present disclosure.

Further, as shown in FIG. 7, the searching module also includes a natural search sub-module 6101 and a natural search ranking sub-module 6102.

The natural search sub-module 6101 is configured to invoke the natural search service, acquire natural search materials and select the first threshold number of natural search materials according to text relevance.

The natural search ranking sub-module 6102 is configured to rank the first threshold number of natural search materials according to ranking scores by a preset ranking method and take the ranking score of each of the natural search materials as the first evaluation score.

The preset ranking method is obtained by training collected data associated with a user experience index in a search log. The data associated with the user experience index may include, but not limited to, a click count and text relevance. The training process of the preset ranking method refers to the method examples, which will not be repeated here.

In the example, a first round of ranking may be performed for natural search results by a simple ranking method and then screening is performed for the natural search results to reduce the number of the search results, thereby improving the pushing efficiency. The screened-out natural search results are re-ranked by a preset ranking method. A ranking factor in which the search server is interested may be introduced in the preset ranking method to increase relevance of the natural search results and further improve the user experience.

Further, as shown in FIG. 7, the searching module also include a push search sub-module 6103 and a push score calculating sub-module 6104.

The push search sub-module 6103 is configured to invoke the push information search service, acquire push materials, and select the second threshold number of push materials according to text relevance.

The push score calculating sub-module 6104 is configured to respectively calculate second evaluation scores of the second threshold number of push materials according to a preset push evaluation parameter and a score weight of the push evaluation parameter.

In a specific implementation, the push score calculating sub-module is specifically configured to obtain the score weight of the push evaluation parameter of the push material corresponding to the search word; and take a product obtained by multiplying the push evaluation parameter of the push material with the score weight as the second evaluation score of the push material. The obtaining process of the score weight of the push evaluation parameter of the push material corresponding to the search word refers to the method examples and FIG. 3, which will not be repeated here.

In this example, a first round of ranking may be performed for the natural search results by a simple ranking method and then screening is performed for the natural search results, thereby reducing the number of search results and improving the pushing efficiency. By calculating the second evaluation scores of the push materials with the score weight of the push evaluation parameter, ranking positions of the materials with push attributes in the returned natural search list may be dynamically balanced, thereby further improving the user experience.

Figure 8:
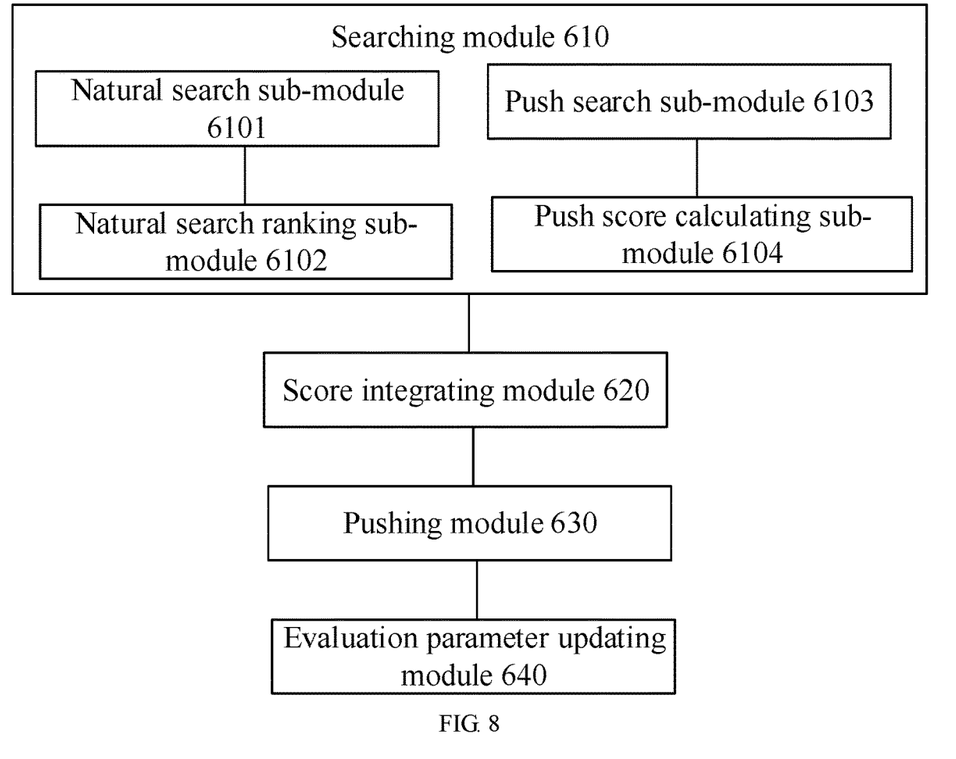
FIG. 8 is a schematic diagram illustrating a functional module of a control logic for pushing information according to still another example of the present disclosure.

In an example, as shown in FIG. 8, the device further includes an evaluation parameter updating module 640.

The evaluation parameter updating module 640 may be configured to optimize and update the score weight λ of the push evaluation parameter of materials corresponding to the search word according to a search log under a constraint of a preset user experience index. The λ value for each category may be optimized based on an off-line batch gradient descent algorithm and then uploaded to a search system, and may also be optimized based on an online batch gradient descent algorithm and updated in real time.

By continuously optimizing the score weight λ of the push evaluation parameter, changes of search results caused by changes of different query time, query places and the like may be effectively balanced, so that the push information is always ranked in an appropriate position of a search result, thereby effectively improving the user experience, and ensuring a click rate of a search result with push attribute.

Taking software implementation as an example, how the device for pushing information executes the control logic 60 is further described. In this example, the control logic in the present disclosure may be understood as the machine readable instructions stored on the machine readable storage medium 52. When the processor 51 on the device for pushing information in the present disclosure executes the control logic, the processor 51 invokes machine readable instructions stored on the machine readable storage medium 52 and executes the machine readable instructions to:

obtain a natural search list by invoking a natural search service to perform a search operation on a search word, where the natural search list includes a first threshold number of natural search materials and a first evaluation score of each of the natural search materials;

obtain a push information list by invoking a push information search service to perform the search operation on the search word, where the push information list includes a second threshold number of push materials and a second evaluation score of each of the push materials;

obtain an integrated evaluation score of each of the natural search materials in the natural search list by integrating the first evaluation score and the second evaluation score of a material existing in the natural search list and the push information list at the same time;

re-rank the natural search materials in the natural search list according to the integrated evaluation scores; and push re-ranked natural search materials.

In this example, when obtaining the natural search list by invoking the natural search service to perform the search operation on the search word, the machine readable instructions stored on the machine readable storage medium 52 cause the processor 51 to:

invoke the natural search service;

acquire natural search materials;

select the first threshold number of natural search materials according to text relevance;

rank the first threshold number of natural search materials according to ranking scores by a preset ranking method; and take the ranking score of each of the natural search materials as the first evaluation score.

In this example, the preset ranking method is obtained by training collected data associated with a user experience index in a search log.

In this example, when obtaining the push information list by invoking the push information search service to perform the search operation on the search word, the machine readable instructions stored on the machine readable storage medium 52 cause the processor 51 to:

invoke the push information search service;

acquire push materials;

select the second threshold number of push materials according to text relevance; and respectively calculate second evaluation scores of the second threshold number of push materials according to a preset push evaluation parameter and a score weight of the push evaluation parameter.

In this example, when respectively calculating the second evaluation scores of the second threshold number of push materials according to the preset push evaluation parameter and the score weight of the push evaluation parameter, the machine readable instructions stored on the machine readable storage medium 52 cause the processor 51 to:

obtain the score weight of the push evaluation parameter of the push material corresponding to the search word; and take a product obtained by multiplying the push evaluation parameter of the push material with the score weight as the second evaluation score of the push material.

In this example, the machine readable instructions stored on the machine readable storage medium 52 cause the processor 51 to: optimize and update the score weight of the push evaluation parameter of the push material corresponding to the search word according to a search log under a constraint of a preset user experience index.

Each example in this specification is described in a progressive manner, each example focuses on differences from other examples, and same or similar parts among the examples may be referred to each other. Since a device example is basically similar to a method example, the description is made simply, and relevant parts may be referred to part of the description of the method example.

The above are detailed descriptions of a method and a device for pushing information provided by the present disclosure. Specific examples are used herein to set forth the principles and the implementing manner of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

Through the above descriptions of the examples, those of skill in the art may clearly understand that each example may be implemented by means of software and a necessary common hardware platform, and of course, may also be realized by hardware. Based on such understanding, the technical scheme of the present disclosure essentially or a part contributing to the prior art may be embodied in the form of a software product, the computer software product may be stored in computer-readable storage medium, such as a read-only memory (ROM)/a random access memory (RAM), a magnetic disk and an optical disk, and includes several instructions for enabling a computer device (may be a personal computer, a server or a network device, etc.) to execute a method described in each example or a particular part of an example.

The invention claimed is:

1. A method of pushing information, comprising:
receiving a search word entered in a client;
obtaining a natural search list by invoking a natural search service to perform a search operation on the search word, wherein the natural search list comprises a first threshold number of natural search materials and a first evaluation score of each of the natural search materials, the natural search service being configured to perform a natural search on the search word;
obtaining a push information list by invoking a push information search service to perform a search operation on the search word, wherein the push information list comprises a second threshold number of push materials and a second evaluation score of each of the push materials, the push information search service being configured to perform a non-natural search on the search word;
obtaining an integrated evaluation score of each of the natural search materials in the natural search list by integrating the first evaluation score and the second evaluation score of a material existing in the natural search list and the push information list at the same time;
re-ranking the natural search materials in the natural search list according to the integrated evaluation scores; and
pushing re-ranked natural search materials to the client;
wherein obtaining the push information list by invoking the push information search service to perform the search operation on the search word further comprises:
invoking the push information search service;
acquiring push materials;
selecting the second threshold number of push materials according to text relevance; and
respectively calculating second evaluation scores of the second threshold number of push materials according to a preset push evaluation parameter and a score weight of the push evaluation parameter; and
wherein respectively calculating the second evaluation scores of the second threshold number of push materials according to the preset push evaluation parameter and the score weight of the push evaluation parameter comprises:
obtaining the score weight of the push evaluation parameter of the push material corresponding to the search word; and
taking a product obtained by multiplying the push evaluation parameter of the push material with the score weight as the second evaluation score of the push material.

2. The method according to claim 1, wherein obtaining the natural search list by invoking the natural search service to perform the search operation on the search word further comprises:
invoking the natural search service;
acquiring natural search materials;
selecting the first threshold number of natural search materials according to text relevance;
ranking the first threshold number of natural search materials according to ranking scores by a preset ranking method; and
taking the ranking score of each of the natural search materials as the first evaluation score.

3. The method according to claim 2, wherein the preset ranking method is obtained by training collected data associated with a user experience index in a search log.

4. The method according to claim 1, further comprising:
optimizing and updating the score weight of the push evaluation parameter of the push material corresponding to the search word according to a search log under a constraint of a preset user experience index.

5. A device for pushing information, the device comprising:
a processor which invokes machine readable instructions corresponding to a control logic for pushing information stored on a storage medium and executes the machine readable instructions to:
receive a search word entered in a client;
obtain a natural search list by invoking a natural search service to perform a search operation on the search word, wherein the natural search list comprises a first threshold number of natural search materials and a first evaluation score of each of the natural search materials, the natural search service being configured to perform a natural search on the search word;
obtain a push information list by invoking a push information search service to perform a search operation on the search word, wherein the push information list comprises a second threshold number of push materials and a second evaluation score of each of the push materials, the push information search service being configured to perform a non-natural search on the search word;
obtain an integrated evaluation score of each of the natural search materials in the natural search list by integrating the first evaluation score and the second evaluation score of a material existing in the natural search list and the push information list at the same time;
re-rank the natural search materials in the natural search list according to the integrated evaluation scores; and
push re-ranked natural search materials to the client;
wherein when obtaining the push information list by invoking the push information search service to perform the search operation on the search word, the machine readable instructions cause the processor to:
invoke the push information search service;
acquire push materials;
select the second threshold number of push materials according to text relevance; and
respectively calculate second evaluation scores of the second threshold number of push materials according to a preset push evaluation parameter and a score weight of the push evaluation parameter, and
wherein when respectively calculating the second evaluation scores of the second threshold number of push materials according to the preset push evaluation parameter and the score weight of the push evaluation parameter, the machine readable instructions cause the processor to:

obtain the score weight of the push evaluation parameter of the push material corresponding to the search word; and take a product obtained by multiplying the push evaluation parameter of the push material with the score weight as the second evaluation score of the push material.

6. The device according to claim 5, wherein when obtaining the natural search list by invoking the natural search service to perform the search operation on the search word, the machine readable instructions cause the processor to:

invoke the natural search service;

acquire natural search materials;

select the first threshold number of natural search materials according to text relevance;

rank the first threshold number of natural search materials according to ranking scores by a preset ranking method; and take the ranking score of each of the natural search materials as the first evaluation score.

7. The device according to claim 6, wherein the preset ranking method is obtained by training collected data associated with a user experience index in a search log.

8. The device according to claim 5, wherein the machine readable instructions cause the processor to:

optimize and update the score weight of the push evaluation parameter of the push material corresponding to the search word according to a search log under a constraint of a preset user experience index.

9. A non-transitory machine readable storage medium storing machine readable instructions executed by one or more processors, the machine readable instructions cause the processors to:

receive a search word entered in a client;

obtain a natural search list by invoking a natural search service to perform a search operation on the search word, wherein the natural search list comprises a first threshold number of natural search materials and a first evaluation score of each of the natural search materials, the natural search service being configured to perform a natural search on the search word;

obtain a push information list by invoking a push information search service to perform a search operation on the search word, wherein the push information list comprises a second threshold number of push materials and a second evaluation score of each of the push materials, the push information search service being configured to perform a non-natural search on the search word;

obtain an integrated evaluation score of each of the natural search materials in the natural search list by integrating the first evaluation score and the second evaluation score of a material existing in the natural search list and the push information list at the same time;

re-rank the natural search materials in the natural search list according to the integrated evaluation scores; and push re-ranked natural search materials to the client, wherein obtaining the push information list by invoking the push information search service to perform the search operation on the search word further comprises:

invoking the push information search service;

acquiring push materials;

selecting the second threshold number of push materials according to text relevance; and respectively calculating second evaluation scores of the second threshold number of push materials according to a preset push evaluation parameter and a score weight of the push evaluation parameter, and wherein respectively calculating the second evaluation scores of the second threshold number of push materials according to the preset push evaluation parameter and the score weight of the push evaluation parameter comprises:

obtaining the score weight of the push evaluation parameter of the push material corresponding to the search word; and taking a product obtained by multiplying the push evaluation parameter of the push material with the score weight as the second evaluation score of the push material.

10. The storage medium according to claim 9, wherein obtaining the natural search list by invoking the natural search service to perform the search operation on the search word further comprises:

invoking the natural search service;

acquiring natural search materials;

selecting the first threshold number of natural search materials according to text relevance;

ranking the first threshold number of natural search materials according to ranking scores by a preset ranking method; and taking the ranking score of each of the natural search materials as the first evaluation score.

11. The storage medium according to claim 10, wherein the preset ranking method is obtained by training collected data associated with a user experience index in a search log.

12. The storage medium according to claim 9, further comprising:

optimizing and updating the score weight of the push evaluation parameter of the push material corresponding to the search word according to a search log under a constraint of a preset user experience index.

* * * * *